Patented Oct. 12, 1943

2,331,864

UNITED STATES PATENT OFFICE 2,331,864

METHOD OF PREPARING POWDERED CELLULOSE ETHERS QUICKLY SOLUBLE IN COLD WATER

Richard W. Swinehart and Albert T. Maasberg, Midland, Mich., assignors to The Dow Chemical Company, Midland Mich., a corporation of Michigan No Drawing. Application March 20, 1942, Serial No. 435,557

5 Claims. (Cl. 260—232)

This invention relates to a method of preparing an improved form of cellulose ethers which are insoluble in hot water and soluble in cold water and particularly to a method of preparing the same in a form which dissolves readily in cold water.

Although many cellulose ethers such as methyl cellulose, ethyl cellulose, etc., which are insoluble in hot water, are ordinarily described as being soluble in cold water, it is well known that it is necessary to treat these ethers, which have heretofore been available only in fibrous form, with hot water for from 20 to 30 minutes before they can be satisfactorily dispersed or dissolved in cold water. Such difficultly soluble fibrous cellulose ethers are herein referred to as cold-water-soluble cellulose ethers. The indirect procedure just referred to for preparing cold-water solutions of the cold-water-soluble cellulose ethers is obviously time-consuming, expensive, and otherwise disadvantageous in many manufacturing operations wherein aqueous compositions comprising these ethers are made. Thus, it is frequently necessary to prepare the solution of the cellulose ether separately from the solution or suspension of the other ingredients and to then mix the two to form the final composition. The necessity of following such a procedure also obviously precludes, in a great many instances, the possibility of preparing mixtures of the dry cold-water-soluble cellulose ethers with other dry materials, such as water-soluble dyes and pigments, and of then preparing thickened aqueous solutions or suspensions therefrom, especially since many of the substances which it is desirable to mix with the dry ether are affected adversely by contact with hot water.

Various procedures have been tried without success in attempting to prepare the cellulose ethers in a form easily dissolved in cold water. Thus it has been proposed to "grind", shred or otherwise subdivide the ethers to increase the rate of dissolving. However, the fibrous forms of the cellulose ethers are difficult to grind or shred and the finely divided material is little, if any, more easily dissolved in cold water than the unground material. The fibrous cellulose ethers, regardless of their state of subdivision, are not easily wetted by cold water, float on the surface when added to cold water, and tend to form into soft lumps, balls or nodules, which it is practically impossible to disperse in cold water. It has also been proposed to dry aqueous solutions of the cellulose ethers and to then grind the dried product. However, the resultant ground material dissolves only extremely slowly in cold water and the method is incapable of practical industrial application.

It is, therefore, an object of the present invention to provide a method of preparing cold-water-soluble cellulose ethers in a form more easily dissolved in cold water than are the fibrous forms neretofore available.

An additional object is to provide a method of preparing the aforesaid cellulose ethers in a dry, powdered form compatible with other dry materials, such as powdered dyes, pigments, adhesives, etc., to form dry compositions which may be brought into solution or suspension in cold water by simple mixing, whereby the cellulose ether performs its usual and characteristic functions in the solution or suspension.

An additional object is to provide a method of preparing the aforesaid cellulose ethers as dry, free flowing, non-caking powders with an apparent density greater than that of the forms heretofore available, thus greatly facilitating storage, handling and shipping.

An additional object is to provide a method whereby cold-water-soluble cellulose ethers may be converted to a form easily dissolved in cold water.

The foregoing and related objects are readily accomplished by forming a wet mixture comprising a fibrous cold-water-soluble cellulose ether and from 72 to 88 per cent by weight of water, maintaining the mixture at a temperature below 50° C. until partial colloiding has occurred, i. e., until a translucent mass without visible fibrous structure is obtained, drying the partially colloided composition and grinding the dried product.

The undried colloidal mixture may, depending upon the conditions under which colloiding is carried out, vary in consistency from a solid, friable gel to a translucent, jellylike mass or, in case colloiding is carried too far, to a transparent gel or even to a liquid sol.

Although any cold-water-soluble fibrous cellulose ether may be converted by the method of the present invention to a form easily dissolved in cold water without a preliminary hot water treatment, the description of the invention will, for the sake of simplicity, be limited to its application to the preparation of methyl cellulose in such form.

The wet fibrous methyl cellulose may result from a manufacturing operation, e. g., from an operation wherein methyl cellulose is prepared in known manner and washed with hot water to free it from water-soluble impurities, or it may be prepared in any convenient manner, such as by making a uniform slurry of from 1 to 5 per cent by weight of methyl cellulose in hot water and subsequently removing the excess water, e. g., by pressing or by filtering under vacuum until only the desired proportion of water is retained in the methyl cellulose. Although the methyl cellulose may be treated with hot water in the above or equivalent manner at any temperature above 50° C., the treatment is preferably carried out at above 70° C., since by so doing a more uniform distribution of the water throughout the mass of the methyl cellulose appears to be obtained. The treatment with hot water may be carried out under super-atmospheric pressure if desired. Although the optimum water content of the water-wet methyl cellulose depends to some extent upon the properties of the particular methyl cellulose employed, a methyl cellulose-water composition comprising from 72 to 88 per cent, preferably from 75 to 85 per cent, by weight of water is usually employed. The use of too small a proportion of water will not ordinarily allow the subsequent colloiding, or gel formation, to proceed uniformly throughout the mass, while the use of too large a proportion of water may allow the colloiding to proceed so rapidly that it is difficult to subsequently dry the partially gelled product before colloiding has progressed to an undesired degree.

The water-wet fibrous methyl cellulose is cooled to below 50° C., preferably to from 5 to 23° C. The cooling may be carried out in any convenient manner, such as by spreading the methyl cellulose on trays and blowing air over it. Care should be taken that undue evaporation of moisture does not take place during the cooling step, since by such evaporation the water content may be lowered to below that required to give satisfactory control of the subsequent colloiding step, or the evaporation of water from the outer layers of the methyl cellulose may lead to uneven gelling of the mass. The cooling may be carried out in a closed system or the humidity of the cooling air may be adjusted to prevent undue evaporation of water. It is usually preferable that the cooling take place as rapidly as possible and that the temperature change throughout the mass be as uniform as is consistent with practical considerations. Other obvious ways of cooling the mass while preventing evaporation of undue amounts of water are apparent.

After the mass has cooled sufficiently, it is allowed to age until the desired degree of gel formation has taken place. Although this usually requires from 5 to 60 minutes, shorter or longer periods may be employed if desired. During the aging period the temperature is maintained substantially constant. It should be understood that colloiding probably begins as soon as the temperature has fallen to, or slightly below, 45° to 55° C. and that it proceeds more rapidly as the temperature is lowered further. For this reason the time during which the temperature of the mass is held substantially constant within the preferred colloiding range will depend, among other factors, upon the amount of colloiding taking place during the cooling just described, i. e. upon the rate of cooling between 45° or 55° C. and the preferred colloiding range.

The progress of the colloiding step may be observed visually. The mass, before colloiding begins, has the appearance of a fairly compact mat of white fibers. As colloiding proceeds the mat becomes slightly grayish in appearance and when the desired degree of gel formation has been reached, little, if any, fibrous structure can be observed although the mass is translucent. Further colloiding which is undesirable, converts the mass to a practically transparent gel which is nearly useless for making the product of the present invention.

It has been observed that gel formation may be hastened considerably and a wider range of water content employed by mechanically colloiding the wet methyl cellulose. This mode of operation is described more fully in a concurrently filed, copending application, Serial No. 435,558.

After gel formation has proceeded to the desired degree, the mass is dried in any convenient manner, such as by placing it on trays and blowing hot air over it. In case the colloiding step is carried out with the material spread on trays, a stream of hot air may simply be blown over the trays as soon as the desired degree of gel formation has been attained. Drying is carried out as rapidly as convenient and at any desired temperature below about 160° C. The temperature is preferably raised rapidly to 45° to 55° C. to prevent further colloiding. It has been observed that at higher drying temperatures the methyl cellulose tends to darken in color and its properties are somewhat changed. Considerable shrinkage of the material occurs during the drying step, although not nearly as much as when the colloiding is allowed to proceed until the mass is practically transparent.

It is thought that by arresting the colloiding, as previously described, while the mass is still translucent, a gel of sufficient structural strength is obtained to prevent complete collapse of the gel structure when it is dried and that a relatively porous product is thus obtained. It has been noted that when colloiding is continued until a practically transparent gel is obtained and the gel then dried, a horny product is obtained which does not possess the desirable solubility characteristics of the product of the present invention.

The dried product may contain less than 15 per cent, preferably less than 10 per cent, of moisture. The dried material, which is friable and easily pulverized, is ground in any of the usual types of pulverizers, and is then ready for use. Although the fineness to which the product is ground is optional, it has been found that a product of 60 to 100 mesh fineness, or finer, is a free-flowing, non-caking powder which dissolves readily when simply stirred with cold water. The individual particles are easily wetted by cold water and sink immediately upon being added to water. 100 cubic centimeters of the powdered methyl cellulose usually weighs between 35 and 45 grams, as compared with the usual weight of from 10 to 15 grams for 100 cubic centimeters of the ordinary fibrous methyl cellulose.

Although, as hereinbefore mentioned, the process of the present invention is applicable to the manufacture of a powder easily dissolved in cold water from any cold-water-soluble cellulose ether, such as can be made, for example, by alkylating an alkali cellulose, the process has particular utility when applied to the powdering of the commercially available methyl cellulose of from 23 to 33 per cent methoxyl content. Such methyl cellulose is frequently prepared by methylating an alkali cellulose and isolating the methylated product from the reaction mixture in the form of a fibrous mass which is then washed with hot water. The washed fibrous mass may conveniently serve as a starting material of the present invention.

It may be mentioned that the process herein described may easily be adapted to continuous operation, since the steps involved are of a type lending themselves particularly to this mode of operation. A uniform product may thus be produced in volume and at low cost.

In a particular example one part by weight of fibrous methyl cellulose which had a methoxyl content of 30.5 per cent and which when dissolved by the usual method involving a preliminary treatment with hot water formed a 2 per cent by weight solution in water having a viscosity of 4000 centipoises at 20° C., was stirred with 67 parts of water at 90° C. until a uniform slurry was obtained. While still hot the slurry was filtered on a vacuum filter and the vacuum was maintained until the mat had a water content of 80 per cent by weight. The hot mat was then spread on trays and cooled by blowing a stream of air over it. The humidity of the air was adjusted so that little or no evaporation of water from the methyl cellulose took place during the cooling. Cooling was continued until the temperature of the wet methyl cellulose reached 18° C. Approximately 20 minutes was consumed in cooling the material from 50° C. to 18° C. The cooled wet material was then held at 18° C. for an additional 20 minutes, at the end of which time a stream of air heated to 105° C. was blown over it to dry it. Drying was continued until the moisture in the methyl cellulose had been reduced to 5 per cent by weight. The dried material was then removed from the trays and ground. The methyl cellulose so obtained was in the form of a free-flowing, non-caking powder which weighed 40 grams per 100 cubic centimeters, which sank immediately when thrown into cold water, and which dissolved rapidly upon being stirred with cold water.

Mixtures of the powdered methyl cellulose with powdered water-soluble dyes and with powdered pigments were prepared. These mixtures were stable during storage and when stirred with cold water formed thickened stable solutions and suspensions, respectively, similar in every respect to solutions and suspensions prepared in the best accepted manner using ordinary fibrous methyl cellulose. A 2 per cent solution prepared by stirring 2 grams of the methyl cellulose with 98 grams of water at 25° C. had a viscosity of 3300 centipoises at 20° C.

We claim:

1. A method of treating a fibrous cold-water-soluble cellulose ether to improve its rate of solution in cold water which comprises adjusting the water content of the water-wet fibrous ether at a temperature above 50° C. to a value of from 72 to 88 per cent by weight, cooling the moist mass to a temperature below 50° C. and maintaining it below such temperature until the mass becomes translucent and substantially without visible fibrous structure, then immediately drying the mass at a temperature above 50° C., and grinding the product.

2. Method according to claim 1, in which the cellulose ether is methyl cellulose.

3. A method of treating a fibrous cold-water-soluble methyl cellulose to improve its rate of solution in cold water which comprises wetting the ether with hot water at a temperature above 50° C., filtering and removing water from the mass, while still at a temperature above 50° C., until the moisture content of the same is reduced to a value of from 72 to 88 per cent by weight, cooling the moist mass to a temperature below 50° C. and maintaining it below such temperature until the mass becomes translucent and substantially without visible fibrous structure, then heating the mass to a temperature above 50° C. to dry the same to a moisture content below 15 per cent by weight, and grinding the dried product.

4. A method of treating a fibrous cold-water-soluble methyl cellulose to improve its rate of solution in cold water which comprises forming a mixture of hot water at a temperature above 70° C. and methyl cellulose having a methoxyl content of from 23 to 33 per cent, filtering the mass and removing water therefrom, while maintaining the same at a temperature above 50° C., until the moisture content of the same is reduced to a value of from 75 to 85 per cent by weight, cooling the moist mass to a temperature below 50° C. and maintaining it below such temperature until the mass becomes translucent and substantially without visible fibrous structure, then air-drying the same at a temperature between 50° C. and 160° C. until the moisture content is reduced to a value below 15 per cent by weight, and grinding the dried product.

5. In a method of preparing a cold-water-soluble methyl cellulose which is readily wettable by and soluble in water, the steps which consist in holding a water-wet mass of fibrous methyl cellulose, having a moisture content between 72 and 88 per cent by weight, at a temperature below 50° C., until gelation has proceeded to the point that the fibrous structure of the mass has substantially disappeared, then heating to a temperature above 50° C. to arrest further gel formation, and drying the mass.

RICHARD W. SWINEHART.
ALBERT T. MAASBERG.